United States Patent
Yamaguchi et al.

(10) Patent No.: US 8,447,476 B2
(45) Date of Patent: May 21, 2013

(54) LUBRICATING OIL SUPPLY CONTROL DEVICE FOR CONSTRUCTION MACHINE

(75) Inventors: Eiji Yamaguchi, Komatsu (JP); Masaaki Kuma, Hakusan (JP); Takashi Kuse, Komatsu (JP); Yasutaka Kuse, legal representative, Hirakata (JP); Miki Kuse, legal representative, Komatsu (JP); Reiko Kuse, legal representative, Komatsu (JP)

(73) Assignee: Komatsu Ltd., Tokyo (JP)

( * ) Notice: Subject to any disclaimer, the term of this patent is extended or adjusted under 35 U.S.C. 154(b) by 194 days.

(21) Appl. No.: 13/145,369

(22) PCT Filed: Feb. 10, 2010

(86) PCT No.: PCT/JP2010/051927
§ 371 (c)(1),
(2), (4) Date: Jul. 20, 2011

(87) PCT Pub. No.: WO2010/101007
PCT Pub. Date: Sep. 10, 2010

(65) Prior Publication Data
US 2011/0276237 A1 Nov. 10, 2011

(30) Foreign Application Priority Data
Mar. 4, 2009 (JP) ................. 2009-050400

(51) Int. Cl.
- F01M 9/00 (2006.01)
- F01M 7/00 (2006.01)
- F16H 61/14 (2006.01)
- F16H 57/04 (2010.01)

(52) U.S. Cl.
USPC .............................. 701/50; 701/68

(58) Field of Classification Search
USPC .......................................... 701/50
See application file for complete search history.

(56) References Cited

U.S. PATENT DOCUMENTS 4,579,021 A * 4/1986 Yamamuro et al. ............. 477/45
4,961,484 A 10/1990 Kato et al.
(Continued)

FOREIGN PATENT DOCUMENTS

| | | |
|---|---|---|
| JP | 64-83971 A | 3/1989 |
| JP | 7-180765 A | 7/1995 |

(Continued)

OTHER PUBLICATIONS

European Search Report of corresponding EP Application No. 10 74 8604.5 dated Apr. 25, 2012.

(Continued)

Primary Examiner — Shelley Chen
(74) Attorney, Agent, or Firm — Global IP Counselors, LLP

(57) ABSTRACT

A lubricating oil supply control device controls a lubricating oil supply amount to a transmission in a construction machine including a torque converter with a lock-up clutch. The lubricating oil supply control device includes a clutch state determining section, a lubricating oil amount detecting section and a lock-up clutch controlling section. The clutch state determining section determines whether or not the lock-up clutch is being coupled. The lubricating oil amount detecting section detects whether or not the lubricating oil supply amount to the transmission is short of a preliminarily set supply amount. The lock-up clutch controlling section decouples the lock-up clutch when the lock-up clutch is being coupled and the lubricating oil supply amount is short of the preliminarily set supply amount.

2 Claims, 3 Drawing Sheets

U.S. PATENT DOCUMENTS

| | | | |
|---|---|---|---|
| 5,231,898 A * | 8/1993 | Okura | 477/95 |
| 5,474,428 A * | 12/1995 | Kimura et al. | 417/16 |
| 5,787,379 A | 7/1998 | Ochiai et al. | |
| 6,269,294 B1 * | 7/2001 | Saito et al. | 701/54 |
| 6,328,674 B1 * | 12/2001 | Matsue et al. | 477/155 |
| 2003/0000492 A1 * | 1/2003 | Mori et al. | 123/179.31 |
| 2004/0018913 A1 * | 1/2004 | Okamoto et al. | 477/62 |
| 2004/0116252 A1 * | 6/2004 | Iwamoto et al. | 477/156 |
| 2005/0187066 A1 * | 8/2005 | Moses et al. | 477/2 |
| 2006/0189436 A1 * | 8/2006 | Nakashima et al. | 477/174 |
| 2009/0055061 A1 * | 2/2009 | Zhu | 701/55 |

FOREIGN PATENT DOCUMENTS

| | | |
|---|---|---|
| JP | 10-325461 A | 12/1998 |
| JP | 2006-300231 A | 11/2006 |

OTHER PUBLICATIONS

European Search Report of corresponding EP Application No. 12 15 1601.7 dated Apr. 25, 2012.

International Search Report of corresponding PCT Application No. PCT/JP2010/051927.

\* cited by examiner

LUBRICATING OIL SUPPLY CONTROL DEVICE FOR CONSTRUCTION MACHINE

CROSS-REFERENCE TO RELATED APPLICATIONS

This national phase application claims priority to Japanese Patent Application No. 2009-050400 filed on Mar. 4, 2009. The entire disclosure of Japanese Patent Application No. 2009-050400 is hereby incorporated herein by reference.

TECHNICAL FIELD

The present invention relates to a lubricating oil supply control device and particularly to a construction machine lubricating oil supply control device configured to control a transmission lubricating oil supply of a construction machine configured to transmit power from an engine to a transmission through a torque converter with a lock-up clutch.

Background Art

The construction machines, such as the wheel loaders and the dump trucks, are configured to supply pressurized oil to a clutch control valve of a transmission while being configured to decompress the pressurized oil through a main relief valve and supply the decompressed oil to a torque converter. Further, the transmission is configured to be lubricated by the pressurized oil from the outlet of the torque converter.

In the aforementioned structure, an oil pump configured to be driven by an engine is used for pressurized oil supply. The fixed displacement pumps at low prices are generally used as the oil pumps for pressurized oil supply. The pump discharge amount accordingly varies with the engine speed.

Meanwhile, the torque converter is provided with a lock-up clutch for improvement of a fuel efficiency and increase in a power transmission efficiency (e.g., see Japan Laid-open Patent Application Publication No. JP-A-H10-325461). When the lock-up clutch is coupled (i.e., turned on, also hereinafter referred to as a locked-up state), power of the engine is directly transmitted to the transmission without intervention of fluid. When the lock-up clutch is decoupled (i.e., turned off, also hereinafter referred to as a torque-converting state), power is transmitted to the transmission through the fluid. The lock-up clutch is basically turned on and off depending on the vehicle speed. When the vehicle speed is reduced, the lock-up clutch is configured to be turned off for producing the torque-converting state. Accordingly, traction force is increased and an engine stall is prevented.

Summary

As described above, power is directly transmitted to the transmission when the lock-up clutch is turned on. In terms of improvement of fuel efficiency, the locked-up state is desirably kept to a possible lowest vehicle speed range.

When a locked-up range is extended to a lower speed range, however, this may result in insufficiency of the amount of lubricating oil supply. When a wheel loader loaded with cargo is assumed to go up a steep slope at the third speed (i.e., the maximum speed stage), for instance, the vehicle speed is reduced due to large travel load even if an accelerator pedal is maximally pressed down. When the locked-up state is herein maintained, the engine speed is reduced in response to reduction in a vehicle speed. Therefore, the discharge amount of the lubricating oil from the pump is reduced and the amount of lubricating oil supply becomes insufficient when the vehicle continuously goes up the slope for a long period of time at a low vehicle speed closer to the limit speed for maintaining the locked-up state. The transmission is damaged due to such an insufficient amount of lubricating oil supply.

It should be noted that the engine speed is increased by shifting down the speed stage and an insufficient amount of lubricating oil supply is accordingly resolved. However, an automatic speed change (shifting from the third speed stage down to the second speed in this example) is executed after the locked-up state is switched into the torque-converting state. Therefore, the amount of lubricating oil supply becomes insufficient as described above, especially when the engine speed for deactivating the locked-up state is set to be low in order to improve fuel efficiency. The aforementioned problem is not herein caused when an operator deactivates an automatic speed change mode and manually shifts the third speed stage down to the second speed stage. However, all the operators do not necessarily execute an appropriate speed change operation.

As a countermeasure of the aforementioned drawback, it is possible to suggest enlargement of the pump capacity for ensuring a sufficient amount of oil supply at a low engine speed. However, pump loss is increased with increase in an oil pump size. Therefore, a fuel consumption reduction effect, achieved by extension of the locked-up range, is largely reduced.

It is an object of the present invention to enable a locked-up state at a low speed range and prevent thereby-caused insufficiency in the amount of lubricating oil to be supplied to a transmission.

A lubricating oil supply control device for a construction machine according to a first aspect of the present invention is a device configured to control the amount of a lubricating oil to be supplied to the transmission in the construction machine configured to transmit power from an engine to a transmission through a torque converter with a lock-up clutch. The lubricating oil supply control device includes a clutch-state determining section, a lubricating oil amount detecting section and a lock-up clutch controlling section. The clutch-state determining section is configured to determine whether or not the lock-up clutch is set to be in a coupled state. The lubricating oil amount detecting section includes an engine speed detecting section and a limit engine speed time counting section. The engine speed detection section is configured to detect an engine speed, whereas the limit engine speed time counting section is configured to determine whether or not the engine continuously rotates at a predetermined limit engine speed or less for a predetermined period of time. The lubricating oil amount detecting section is configured to detect whether or not the amount of the lubricating oil to be supplied to the transmission is short of a preliminarily set supply amount based on a result counted by the limit engine speed time counting section. The lock-up clutch controlling section is configured to set the lock-up clutch to be in a decoupled state when the lock-up clutch is set to be in the coupled state and the amount of the lubricating oil to be supplied to the transmission is short of the preliminarily set supply amount.

According to the lubricating oil supply control device of the first aspect of the present invention, the state of the lock-up clutch (i.e., either the coupled state or the decoupled state) is determined. Further, it is determined whether or not the amount of the lubricating oil to be supplied to the transmission is short of the preliminarily set supply amount. It is herein determined that the amount of lubricating oil supply is insufficient when the engine continuously rotates at the predetermined limit engine speed or less for a predetermined period of time. Further, even in a speed range that the locked-up state should be normally produced, the lock-up clutch is forcibly controlled to be in the decoupled state when the lock-up clutch is set to be in the coupled state and the amount of lubricating oil supply is short of the preliminarily set supply amount.

The locked-up state is deactivated by setting the lock-up clutch to be in the decoupled state when the amount of lubricating oil supply is short of the preliminarily set supply amount while the locked-up state is continued. Deactivation of the locked-up state reduces an engine load and the engine speed becomes faster than that in the locked-up state. Therefore, the discharge amount of the oil pump to be driven by the engine is increased, and the amount of lubricating oil supply required for lubrication of the transmission is ensured.

Further, excessive/insufficient lubricating oil supply is detected by detecting the engine speed and counting time. The well-known sensors and the like have been provided in the construction machines for detecting the engine speed. Therefore, it is possible to detect the amount of the lubricating oil to be supplied to the transmission without additionally using a special component.

A lubricating oil supply control device for a construction machine according to a second aspect of the present invention relates to the lubricating oil supply control device for a construction machine according to the first aspect of the present invention. In the lubricating oil supply control device, the limit engine speed time counting section includes a speed stage detecting section and a limit engine speed storing section. The speed stage detecting section is configured to detect a currently selected one of a plurality of speed stages in the transmission, whereas the limit engine speed storing section is configured to store a plurality of limit engine speeds uniquely set for the respective speed stages. Further, the predetermined limit engine speed, set as a threshold speed used for determining whether or not the engine continuously rotates for a predetermined period of time, is a limit engine speed corresponding to the currently selected speed stage in the transmission.

According to the lubricating oil supply control device of the second aspect of the present invention, the engine speeds for switching the lock-up clutch between the coupled state and the decoupled state are uniquely set for the respective speed stages. Therefore, it is possible to execute a more accurate control by changing the limit engine speeds depending on the speed stages.

A lubricating oil supply control device for a construction machine according to a third aspect of the present invention is a device configured to control the amount of a lubricating oil to be supplied to the transmission in the construction machine configured to transmit power from an engine to a transmission through a torque converter with a lock-up clutch. The lubricating oil supply control device includes a clutch-state determining section, a lubricating oil amount detecting section and the lock-up clutch controlling section. The clutch-state determining section is configured to determine whether or not the lock-up clutch is set to be in a coupled state. The lubricating oil amount detecting section includes a speed stage detecting section, a vehicle speed detecting section and a minimum vehicle speed time counting section. The speed stage detecting section is configured to detect a currently selected one of a plurality of speed stages in the transmission. The vehicle speed detecting section is configured to detect a vehicle speed. The minimum vehicle speed time counting section is configured to determine whether or not an arbitrary one of minimum vehicle speeds uniquely set for the respective speed stages is continued in a corresponding one of the speed stages for a predetermined period of time. The lubricating oil amount detecting section is configured to detect whether or not the amount of the lubricating oil to be supplied to the transmission is short of a preliminarily set supply amount based on a result counted by the minimum vehicle speed time counting section. The lock-up clutch controlling section is configured to set the lock-up clutch to be in a decoupled state when the lock-up clutch is set to be in the coupled state and the amount of the lubricating oil to be supplied to the transmission is short of the preliminarily set supply amount.

According to the lubricating oil supply control device of the third aspect of the present invention, both the speed stage currently selected in the transmission and the vehicle speed are detected. The engine speed can be calculated based on the detected values. Further, it is determined that the lubricating oil supply is insufficient when an arbitrary one of the minimum vehicle speeds uniquely set for the respective speed stages is continued for a predetermined period of time, in other words, when the engine continuously rotates at a predetermined engine speed or less for a predetermined period of time. The well-known sensors have been provided in the construction machines for detecting the speed stage and the vehicle speed. Therefore, the amount of the lubricating oil to be supplied to the transmission can be detected without additionally using a special component.

According to the present invention, a locked-up state is enabled at a low speed range and thereby fuel efficiency can be enhanced while the amount of lubricating oil supply can be prevented from becoming insufficient in a transmission.

DESCRIPTION OF THE EMBODIMENTS

Overall Structure

Figure 1:
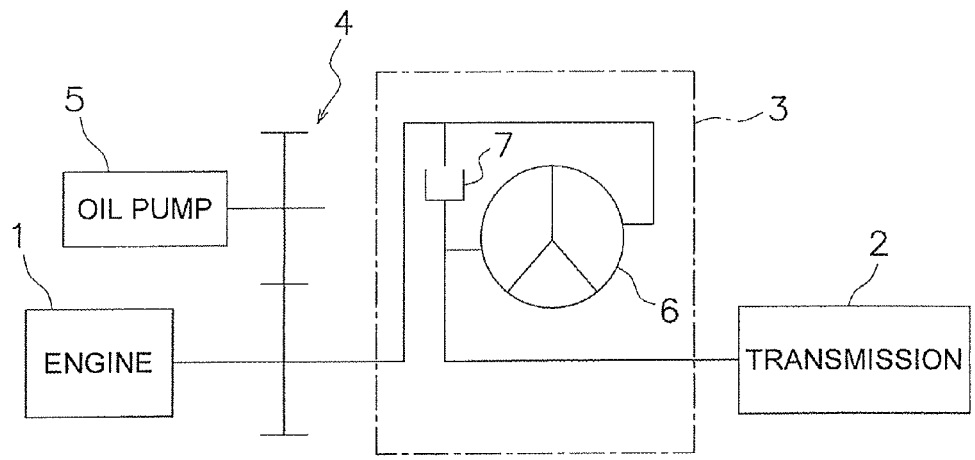
FIG. 1 is a schematic diagram of a power transmission path in a construction machine according to an exemplary embodiment of the present invention.

FIG. 1 schematically represents a power transmission path of a construction machine according to an exemplary embodiment of the present invention. The construction machine is a wheel loader, for instance, and includes an engine 1, a transmission 2 and a torque converter 3 as illustrated in FIG. 1. The transmission 2 is configured to receive power transmitted from the engine 1. The torque converter 3 is disposed between the engine 1 and the transmission 2. Further, an oil pump 5 is coupled to the engine 1 through a gear train 4. The oil pump 5 is thus configured to be driven by rotation of the engine 1, and is configured to supply pressurized oil and lubricating oil to related components.

The torque converter 3 includes a torque converter body 6 and a lock-up clutch 7. The torque converter body 6 includes an impeller, a turbine and a stator. The torque converter body 6 is configured to transmit power from the engine 1 to the transmission 2 through fluid.

The torque converter 3 is configured to directly transmit power to the transmission 2 (i.e., a locked-up state) when the lock-up clutch 7 is coupled (i.e., turned on). On the other hand, the torque converter 3 is configured to transmit power from the engine 1 to the transmission 2 through the fluid residing in the torque converter body 6 when the lock-up clutch 7 is decoupled (i.e., turned off).

Hydraulic Circuit and Control Circuit

Figure 2:
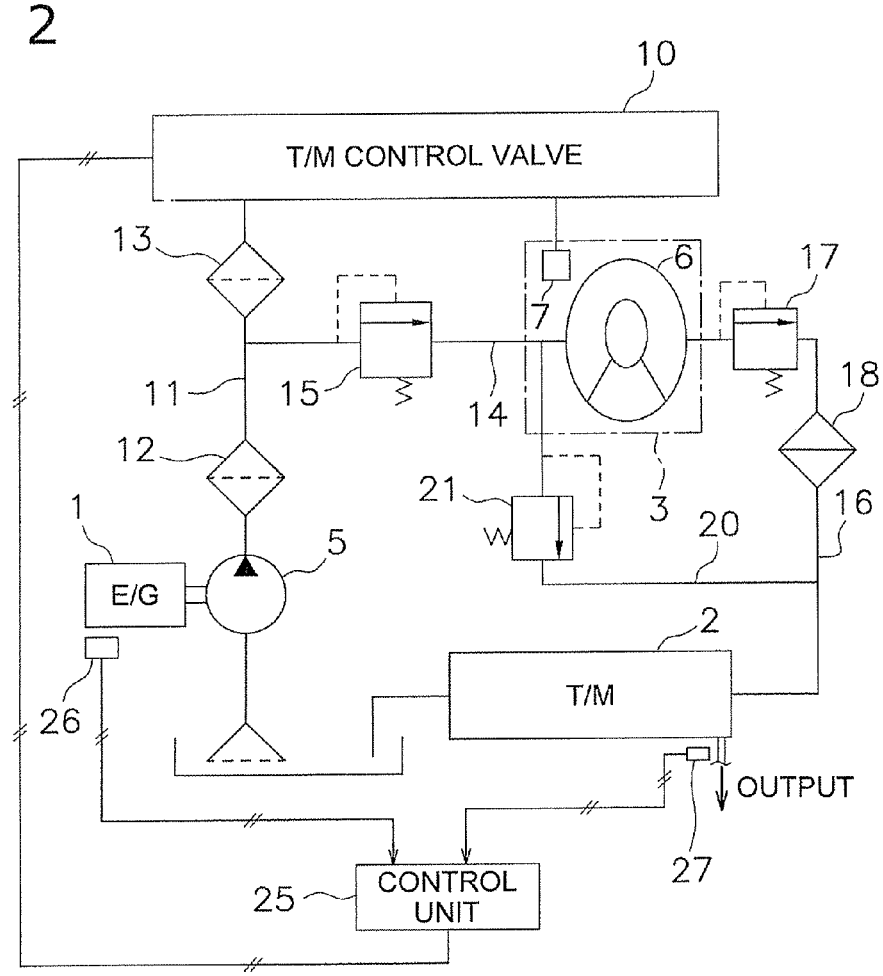
FIG. 2 is a diagram of a hydraulic circuit and a control circuit in the construction machine.

FIG. 2 schematically represents a hydraulic circuit and a control circuit of the construction machine represented in FIG. 1. The construction machine includes a transmission control valve (hereinafter simply referred to as a control valve) 10. The transmission control valve 10 is configured to receive the pressurized oil supplied from the oil pump 5. A first oil path 11 is disposed between the oil pump 5 and the control valve 10. Two filters 12 and 13 are disposed in the first oil path 11. A second oil path 14 is disposed between the first oil path 11 and the torque converter 3. A first pressure control valve 15 is disposed in the second oil path 14. The first pressure control valve 15 is configured to control the pressure of the main pressurized oil in the hydraulic circuit. Further, a third oil path 16 is disposed between the outlet of the torque converter 3 and the transmission 2. A second pressure control valve 17 and a cooler 18 are disposed in the third oil path 16. The second pressure control valve 17 is configured to regulate the pressure within the torque converter 3. Yet further, a fourth oil path 20 is disposed between the inlet of the torque converter 3 and the third oil path 16. A third pressure control valve 21 is disposed in the fourth oil path 20. The third pressure control valve 21 is configured to control the pressure of the pressurized oil to be supplied to the torque converter 3.

Further, the construction machine includes a control unit 25. The control unit 25 is formed by a microcomputer including a RAM, a ROM and a CPU and the like. An engine speed sensor 26 and a vehicle speed sensor 27 are connected to the control unit 25. The engine speed sensor 26 is configured to detect the engine speed, whereas the vehicle speed sensor 27 is configured to detect the vehicle speed. It should be noted that the control unit 25 is configured to determine whether the lock-up clutch 7 is turned on or off, or which of the speed stages is currently selected by the transmission 2.

The control unit 25 stores limit engine speeds uniquely set for the respective speed stages and a permissive continuous time set for the engine speeds. The term "limit enegine speed" herein refers to a predetermined low engine speed N set for forcibly turning on the lock-up clutch 7 when the engine continuously rotates at the engine speed N or less for a predetermined period of time. If the vehicle speed is reduced to a predetermined speed or less while the lock-up clutch 7 is being turned on and the locked-up state is being produced, the lock-up clutch 7 is then turned off and the locked-up state is switched into the torque-converting state. The limit engine speed N, specifically, is slightly higher than the engine speed corresponding to the vehicle speed at which the locked-up state is switched into the torque-converting state. On the other hand, the term "permissive continuous time" refers to a threshold time period causing insufficiency in the amount of the lubricating oil to be supplied to the transmission 2 when the limit engine speed is continued beyond this time period. The permissive continuous time is uniquely set for the respective machine types based on experiments. It should be noted that the permissive continuous time is identically set for all the speed stages, although the limit engine speeds are uniquely set for the respective speed stages.

Control Processing

Figure 3:
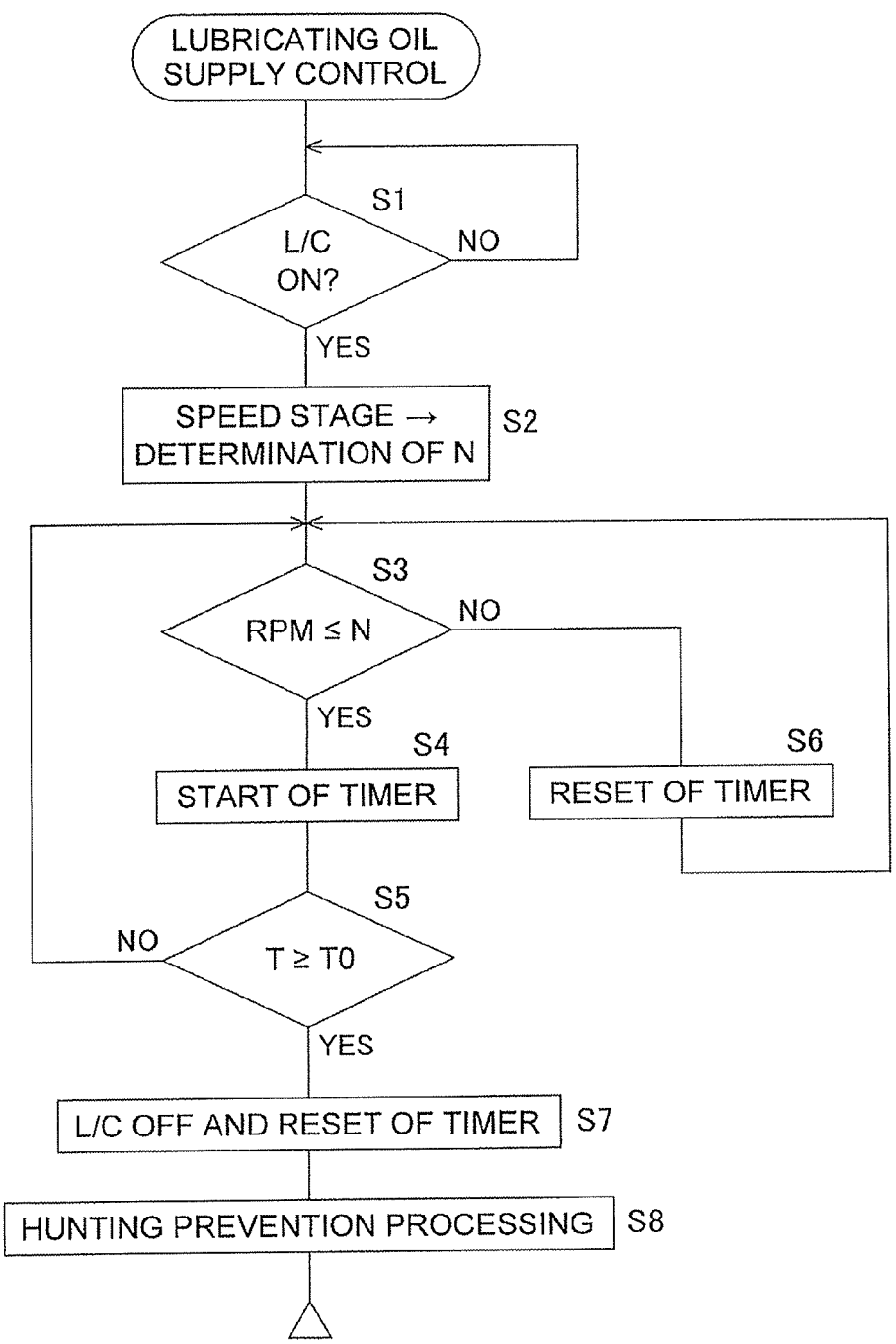
FIG. 3 is a flowchart of a lubricating oil supply control.

FIG. 3 represents a flowchart of a control processing of the amount of lubricating oil supply. The lubricating oil supply control will be hereinafter explained with reference to the flowchart.

First in Step S1, it is determined whether or not the lock-up clutch 7 is being turned on and a locked-up state is being produced. When the lock-up clutch 7 is being turned off, the control processing will not be executed.

When the lock-up clutch 7 is being turned on and the locked-up state is being produced, the processing proceeds from Step S1 to Step S2. In Step S2, information of a speed stage currently selected by the transmission 2 is obtained and data of a limit engine speed N corresponding to the currently selected speed stage is obtained.

Next in Step S3, it is determined whether or not the engine speed is less than or equal to the limit engine speed N. For example, when a wheel loader loaded with cargo goes up a steep slope at the third stage (i.e., the maximum speed stage) as described in the aforementioned example, the vehicle speed is reduced due to a large travel load even when the accelerator pedal is fully pressed down. Therefore, the engine speed is reduced with reduction in a vehicle speed when the locked-up state is kept under the condition. In some cases, the engine speed may be further reduced to be less than or equal to the limit engine speed.

When the engine speed is reduced to be less than or equal to the limit engine speed N under the condition, the processing proceeds from Step S3 to Step S4. In Step 4, a timer is activated. Specifically, the timer starts counting a period of time when the engine continuously rotates at the limit engine speed N or less. Subsequently in Step S5, it is determined whether or not a counted time T reaches a permissive continuous time T0. Steps S3 to S5 are repeatedly executed until the counted time, i.e., a period of time when the engine continuously rotates at the limit engine speed N or less, reaches the permissive continuous time T0.

It should be noted that the processing proceeds from Step S3 to Step S6 when the engine speed exceeds the limit engine speed N before the counted time reaches the permissive continuous time T0. In Step S6, a counted value of the timer is reset and the processing returns to Step S3.

If a period of time when the engine continuously rotates at the limit engine speed N or less reaches the permissive continuous time T0, it is then determined that the amount of the lubricating oil to be supplied to the transmission 2 becomes insufficient when the locked-up state is continued beyond the permissive continuous time T0. The processing accordingly proceeds from Step S5 to Step S7. In Step S7, the lock-up clutch 7 is turned off the locked-up state is switched into the torque-converting state. Further, the timer is reset. The switching reduces an engine load, and the engine speed is accordingly increased. In other words, the rotation speed of the oil pump 5 is also increased and the discharge amount from the oil pump 5 is increased. Accordingly, the amount of the lubricating oil to be supplied to the transmission 2 is also increased.

Next in Step S8, a hunting prevention processing is executed. Specifically, the engine speed is increased when the lock-up clutch 7 is turned off as described above. However, the lock-up clutch 7 is turned on when the engine speed is increased. Accordingly, the torque-converting state is switched into the locked-up state. When the engine speed is herein rapidly reduced from a high engine speed to a low engine speed or then further increased from the low engine speed to a high engine speed, the torque-converting state and the locked-up state are frequently switched back and forth and this causes a hunting phenomenon.

To cope with the above, the following hunting prevention processing is executed. It is determined that a hunting phenomenon is caused when the torcon/locked-up state is continued only for a predetermined period of time or less. Further, the engine speed set for turning on the lock-up clutch 7 is shifted when frequency of hunting phenomena becomes greater than a predetermined value.

The processing represented in FIG. 3 is executed when the lock-up clutch 7 is turned on and the locked-up state is produced by executing the aforementioned processing.

It should be noted that the following steps will be also executed although not represented in the figure. It is always determined whether or not the locked-up state is being produced during execution of the aforementioned Steps S2 to S7. When the lock-up clutch 7 is turned off due to the other conditions (e.g., the vehicle speed is reduced to a predetermined speed for switching the locked-up state into the torque-converting state), the timer is rest and the subsequent steps will be canceled. The processing accordingly returns to Step S1.

(1) In the present exemplary embodiment, it is determined that the amount of the lubricating oil to be supplied to the transmission 2 is insufficient when the engine rotates at an engine speed less than or equal to the limit engine speed for a predetermined period of time while the locked-up state is continued. Accordingly, the lock-up clutch 7 is forcibly turned off and the locked-up state is switched into the torque-converting state. Accordingly, an engine load is reduced and the engine speed is increased. The discharge amount from the oil pump 5 is thereby increased. Consequently, a sufficient amount of the lubricating oil is supplied to the transmission 2.

With the aforementioned lubricating oil supply control, the lock-up clutch 7 can be turned on and the locked-up state can be produced at a low engine speed range similarly to or less than that of the well-known construction machines. Therefore, fuel efficiency can be enhanced.

(2) It is possible to detect insufficiency in the amount of lubricating oil to be supplied to the transmission 2 by measuring the engine speed and counting a period of time. Therefore, it is possible to obtain the information of insufficiency in the amount of lubricating oil supply using components provided in the well-known construction machines. It is thereby possible to suppress cost increase for achieving the present exemplary embodiment.

(3) The limit engine speeds are uniquely set for the respective speed stages. Therefore, more accurate control can be executed.

Other Exemplary Embodiments

In the aforementioned exemplary embodiment, insufficiency in the amount of lubricating oil supply is configured to be detected based on the detected engine speed and whether or not the engine rotates at the limit engine speed or less for the permissive continuous time. In the prevent invention, however, the configuration for detecting insufficiency in the amount of lubricating oil supply is not limited to the above.

Figure 4:
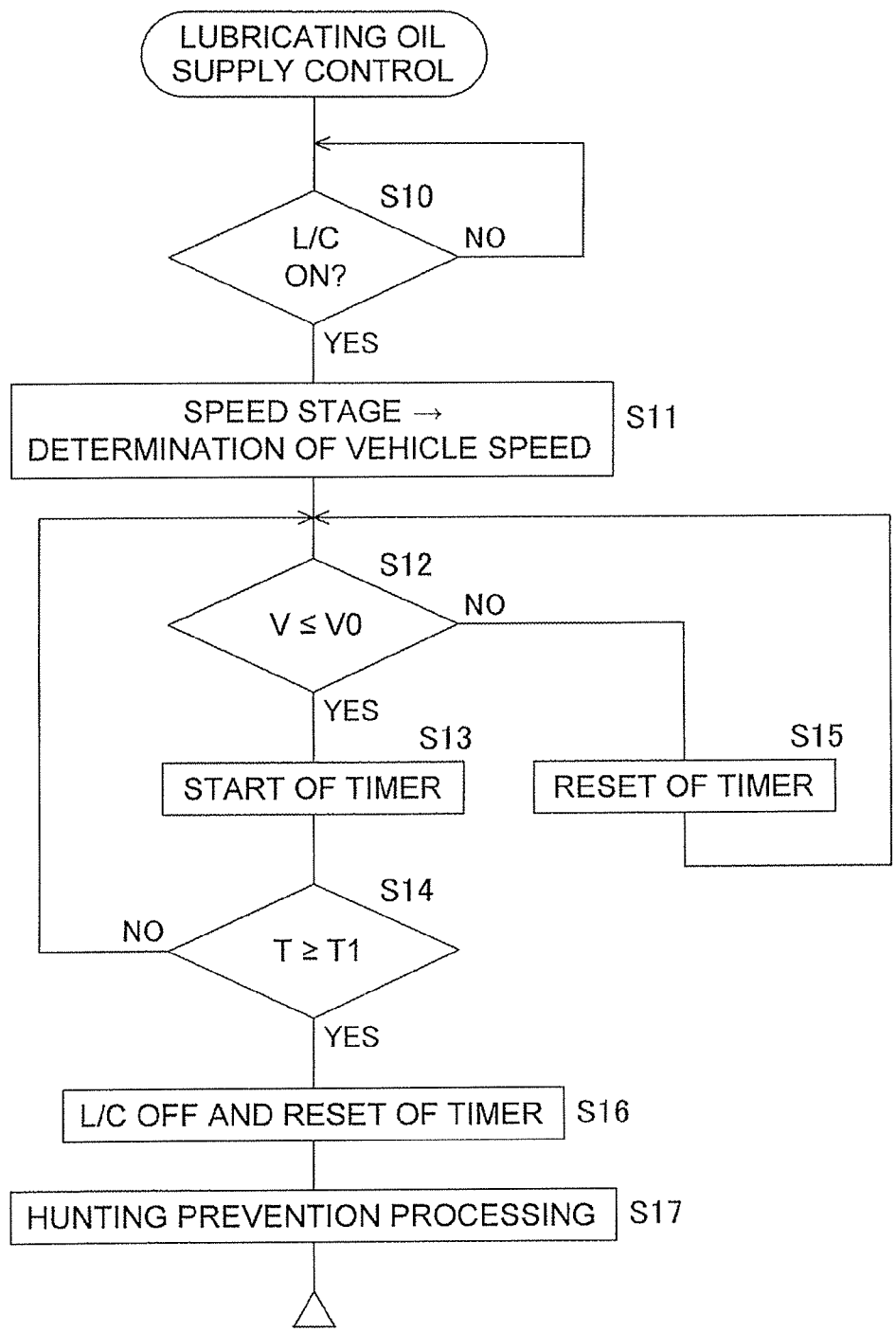
FIG. 4 is a flowchart corresponding to FIG. 3 in another exemplary embodiment of the present invention.

FIG. 4 represents another exemplary embodiment. In the exemplary embodiment of FIG. 4, the amount of lubricating oil supply is configured to be detected by measuring a vehicle speed and counting a period of time when a predetermined vehicle speed is continued.

Specifically, it is determined whether or not the locked-up state is being produced in Step S10. When the lock-up clutch 7 is being turned on and the locked-up state is being produced, the processing proceeds from Step S10 to Step S11. In Step S11, the information of a speed stage currently selected by the transmission 2 is obtained and the data of a minimum vehicle speed V corresponding to the currently selected speed stage is obtained.

The term "minimum vehicle speed" herein refers to a low vehicle speed V set for forcibly turning on the lock-up clutch 7 when the vehicle speed V is continued in an arbitrary speed stage for the permissive continuous time. If the vehicle speed is reduced to a predetermined speed or less while the lock-up clutch 7 is being turned on and the locked-up state is being produced, the lock-up clutch 7 is then turned off and the locked-up state is switched into the torque-converting state. The minimum vehicle speed V, specifically, is slightly faster than the vehicle speed at which the locked-up state is switched into the torque-converting state. On the other hand, the term "permissive continuous time" refers to a threshold time period causing insufficiency in the amount of the lubricating oil to be supplied to the transmission 2 when the mimimum vehicle speed V is continued beyond this time period. The permissive continuous time is uniquely set for the respective machine types based on experiments. It should be noted that the permissive continuous time is identically set for all the speed stages, although the minimum vehicle speeds V are uniquely set for the respective speed stages.

Next in Step S12, it is determined whether or not the vehicle speed is less than or equal to the minimum vehicle speed V. The processing proceeds from Step S12 to Step S13 when the vehicle speed is reduced to the minimum vehicle speed V or less, for instance, under the condition that a vehicle loaded with cargo goes up a steep slope. In Step S13, a timer is activated. Specifically, the timer starts counting a period of time when the minimum vehicle speed V or less is continued. Subsequently in Step S14, it is determined whether or not a counted time T reaches a permissive continuous time T1. Steps S12 to S14 are repeatedly executed until the counted time, i.e., a period of time when the minimum vehicle speed V or less is continued, reaches the permissive continuous time T1.

It should be noted that the processing proceeds from Step S12 to Step S15 when the vehicle speed exceeds the minimum vehicle speed V before the counted time reaches the permissive continuous time T1. In Step S15, a counted value of the timer is reset and the processing returns to Step S12.

It is determined that the amount of the lubricating oil to be supplied to the transmission 2 is insufficient when a period of time that the minimum vehicle speed V or less is continued reaches the permissive continuous time T1 and the locked-up state is continued beyond the permissive continuous time T1. The processing accordingly proceeds from Step S13 to Step S16. Subsequently in Step S16, the lock-up clutch 7 is turned off and the locked-up state is switched into the torque-converting state. Further, the timer is reset. The switching reduces engine load, and the engine speed is accordingly increased. In other words, the rotation speed of the oil pump 5 is also increased and the discharge amount from the oil pump 5 is increased. Accordingly, the amount of the lubricating oil to be supplied to the transmission 2 is also increased.

A hunting prevention processing in Step S17 is similar to that in Step S8 of the aforementioned exemplary embodiment. The only difference is in that the vehicle speed is configured to be processed in Step S17 whereas the engine speed is configured to be processed in Step S8.

It should be noted that the following steps will be also executed although not represented in the figure. It is always determined whether or not the locked-up state is being produced during execution of the aforementioned Steps S11 to S16. When the lock-up clutch 7 is turned off due to the other conditions (e.g., the vehicle speed is reduced to a predetermined speed for switching the locked-up state into the torque-converting state), the timer is rest and the subsequent steps will be canceled. The processing accordingly returns to Step S10.

This exemplary embodiment can achieve the same advantageous effects as those achieved by the aforementioned exemplary embodiment.

In a transmission of a construction machine, it is possible to set a lock-up clutch to be in a locked-up state at a low speed range for enhancing fuel efficiency, and simultaneously, to prevent insufficiency in the amount of lubricating oil to be supplied to the transmission.

The invention claimed is:

1. A lubricating oil supply control device for a construction machine configured to control an amount of a lubricating oil to be supplied to a transmission of the construction machine that transmits power from an engine to the transmission through a torque converter with a lock-up clutch, the lubricating oil supply control device comprising:
   a clutch-state determining section configured to determine whether or not the lock-up clutch is set to be in a coupled state;
   a lubricating oil amount detecting section including
      an engine speed detecting section configured to detect an engine speed, and
      a limit engine speed time counting section configured to determine whether or not the engine continuously rotates at a predetermined limit engine speed or less for a predetermined period of time,
   the lubricating oil amount detecting section being configured to detect whether or not the amount of the lubricating oil to be supplied to the transmission is short of a preliminarily set supply amount based on a result counted by the limit engine speed time counting section; and
   a lock-up clutch controlling section configured to set the lock-up clutch to be in a decoupled state when the lock-up clutch is set to be in the coupled state and the amount of the lubricating oil to be supplied to the transmission is short of the preliminarily set supply amount.

2. The lubricating oil supply control device for a construction machine recited in claim 1, wherein
   the limit engine speed time counting section includes
      a speed stage detecting section configured to detect a currently selected one of a plurality of speed stages in the transmission, and
      a limit engine speed storing section configured to store a plurality of limit engine speeds uniquely set for the speed stages, respectively, and
   the predetermined limit engine speed is a limit engine speed corresponding to the currently selected one of the speed stages in the transmission.

* * * * *